Figure 2:
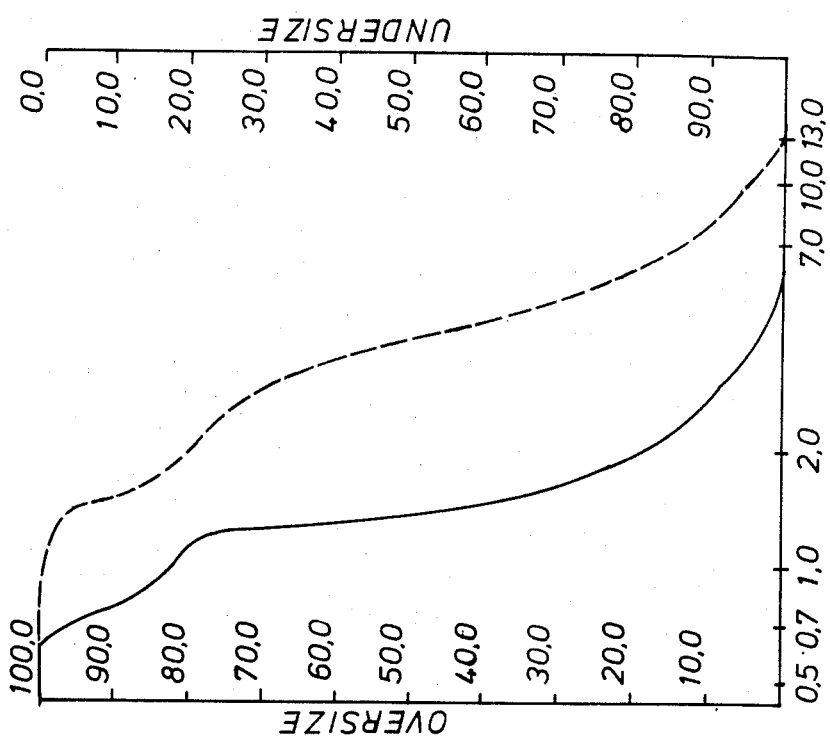

United States Patent [19]

Timmerman et al.

[11] Patent Number: 4,614,708

[45] Date of Patent: Sep. 30, 1986

[54] METHOD FOR THE PREPARATION OF STABLE AQUEOUS DISPERSIONS OF POLYMER BEADS AND THE USE OF THESE DISPERSIONS IN PHOTOGRAPHIC ELEMENTS

[75] Inventors: Daniel M. Timmerman; Jan J. Priem, both of Mortsel; Wilhelmus Janssens, Aarschot, all of Belgium

[73] Assignee: AGFA-Gevaert, N.V., Mortsel, Belgium

[21] Appl. No.: 580,272

[22] Filed: Feb. 16, 1984

Related U.S. Application Data

[63] Continuation of Ser. No. 442,021, Nov. 16, 1982, abandoned.

[30] Foreign Application Priority Data

Nov. 23, 1981 [GB] United Kingdom ............... 8135262

[51] Int. Cl.⁴ .................. G03C 1/84; G03C 1/02
[52] U.S. Cl. ................... 430/517; 430/510; 430/533; 430/536; 430/537; 430/627; 430/931; 430/961; 430/950
[58] Field of Search ............ 430/961, 537, 627, 931, 430/536, 950, 517, 510, 533

[56] References Cited

U.S. PATENT DOCUMENTS

| | | | |
|---|---|---|---|
| 2,548,318 | 4/1951 | Norris | 524/460 |
| 3,516,832 | 6/1970 | Earhart | 430/527 |
| 3,580,734 | 5/1971 | Clachan et al. | 430/529 |
| 3,754,924 | 8/1973 | De Geest et al. | 430/635 |
| 3,856,530 | 12/1974 | Van Paesschen et al. | 430/529 |
| 3,877,942 | 4/1975 | Nagatomo et al. | 430/961 X |
| 3,941,727 | 3/1976 | Timmerman et al. | 430/536 X |
| 4,187,113 | 5/1980 | Mathews et al. | 430/533 |
| 4,287,299 | 9/1981 | Himmelmann et al. | 430/950 |

FOREIGN PATENT DOCUMENTS

| | | |
|---|---|---|
| 0080225 | 1/1983 | European Pat. Off. |
| 1255237 | 12/1971 | United Kingdom |
| 1284460 | 8/1972 | United Kingdom |

*Primary Examiner*—John E. Kittle
*Assistant Examiner*—Cynthia Hamilton
*Attorney, Agent, or Firm*—A. W. Breiner

[57] ABSTRACT

Method for the preparation of stable aqueous dispersions of finely divided solid spherical polymer beads having an average particle size between about 0.5 and about 5 μm and having a glass transition temperature of at least 40° C. by dissolving in an aqueous solvent mixture at least one $\alpha,\beta$-ethylenically unsaturated monomer capable of forming a polymer that is soluble in the monomer(s) present in said aqueous solvent mixture but which is insoluble in said aqueous solvent mixture, a free radical-forming polymerization initiator, and a graft-polymerizable polymer containing hydrophilic groups, heating the solution to a temperature from 50° C. to the reflux temperature thereof with stirring so as to form said polymer beads. The polymer beads can be used in an antifriction surface layer, an antihalation surface layer, an antistatic surface layer, or in a protective surface layer of a photographic element or in a top layer of a drafting film containing a photosensitive layer.

7 Claims, 4 Drawing Figures

METHOD FOR THE PREPARATION OF STABLE AQUEOUS DISPERSIONS OF POLYMER BEADS AND THE USE OF THESE DISPERSIONS IN PHOTOGRAPHIC ELEMENTS

This is a continuation of application Ser. No. 06/442,021 filed Nov. 16, 1982, now abandoned.

The present invention relates to a method for the preparation of stable aqueous dispersions of finely divided solid polymer beads and to the use of those dispersions in photographic elements.

It is generally known to protect photographic elements against mechanical damage or undesired adverse influences on their photographic characteristics by coating them with thin protective surface layers, usually thin hardened gelatin layers.

Mechanical damage of photographic elements or adverse influencing of the photographic characteristics thereof are often incurred indeed e.g. when a layer element is conveyed in dry state over or between rollers and contacting surfaces. Protective gelatin surface layers, however, tend to slide with relative difficulty on surfaces with which they enter into moving contact.

It is also known in the photographic art to use light-sensitive silver halide elements containing matting agents e.g. inorganic pigments such as finely divided silica particles in a surface layer. Silica particles can be incorporated as matting agents into the surface layer(s) of photographic elements for different purposes. For instance, it has been proposed to include finely divided silica particles in the surface layer(s) of photographic elements so as to reduce the sticking tendency of said element, e.g. when stored or packed in rolls or stacks. The roughness resulting from the silica particles at the surface of the photographic element gives a matted appearance to the material and also prevents the generation of static electricity, which may cause sparks and thus exposure of the photographic light-sensitive layer(s), as well as the formation of Newton's ring during printing and enlarging operations, thanks to the fact that the contact surface of said element against another object has become relatively small. Furthermore, the surface layers comprising silica particles may also reduce abrasion by dry-friction and diminish the scratchability of said photographic elements that are stored or packed in contact with other materials, as is the case e.g. with X-ray material packed without interleaves (non-interleaved fold-scratching).

However, the use of silica and other matting particles in a surface layer, e.g. a protective layer applied to the light-sensitive silver halide emulsion layer of a photographic element, also presents a number of drawbacks. For instance it has been observed that the decrease of abrasion is often insufficient as a result of the rough irregular surface of the larger part of the known matting agents. Also, the presence of matting particles in a surface layer of a photographic element may produce an objectionable milky appearance, which—however weak it may be—is undesirable especially when transparent images have to be obtained. As a matter of course transparent images should be entirely free from milky haze and yet the photographic elements leading to those images need protection against mechanical damage or adverse influences on their photographic characteristics as described above. Furthermore a relatively high density of matting particles e.g. silica particles is necessary, which may cause them not to remain suspended in the coating composition. The refractive index may differ too much from that of gelatin, which may cause the silver image to look less black.

It has also been proposed to use finely divided cellulose or derivatives thereof as matting agent. In that case it is essential that the cellulose or derivative thereof be comminuted mechanically or chemically to the required grain size, which involves tedious additional measures.

Hydrophobic polymers may be dissolved in an organic solvent and this solution dispersed in water containing a hydrophilic colloid such as gelatin. Upon evaporation of the organic solvent interesting dispersions can be formed having a particle size as required for matting agents. The disadvantage of this process is the almost unavoidable presence of residual amounts of organic solvent, which gives rise to undesired conglomeration of the polymer particles.

It is further known that very fine dispersions of polymeric materials are obtained when the polymers are formed according to an emulsion polymerisation process. The particle size of emulsion polymer particles, however, is always less than 0.5 $\mu$m, and on the average less than 0.1 $\mu$m, which makes them inappropriate for use as matting agents.

As a result thereof the particle size of the majority of the matting agents so far proposed is either too small or their grain is too coarse and consequently an undesirable clouding forms at the surface of the photographic layer, to which they are applied.

In U.S. Pat. No. 3,941,727 it has been proposed to use polymer particles sizing between 1 and 10 $\mu$m as matting agents in hydrophilic coating compositions. Yet, the preparation of these polymer particles and the control of their size is cumbersome and requires the use of complex apparatuses. Moreover, the size distribution of the particles produced is far too wide so that regretfully disturbing amounts of undersized particles are present as well. Furthermore it is also difficult to prepare polymer particles with a predetermined average particle size.

It is an object of the present invention to provide a method for preparing stable aqueous dispersions of solid, non-abrasive, spherical polymer beads having an average particle size between 0.5 and 5 $\mu$m and being substantially homodisperse i.e. having a substantially uniform size frequency distribution.

A further object is to prepare said dispersions of polymer beads by a simple preparative method in a one-step reaction procedure.

A further object is to provide a method for the preparation of said dispersion of polymer beads with a predetermined average particle size within the above range.

A still further object is to provide a photographic silver halide element comprising in at least one silver halide emulsion layer or other layer and/or in the support polymer beads obtained by said method.

Another object is to provide a photographic element comprising in (a) surface layer(s) said polymer beads protruding from said surface layer(s) and thus acting as spacing agents that provide a safe distance between said surface layer(s) and contacting objects so as to protect the surface(s) of said photographic element against mechanical, physical, or chemical influences e.g. dry friction of said photographic element against contacting objects and transfer or diffusion of matter between said photographic element and contacting objects.

Contacting objects are e.g. rollers or guide members, used in apparatuses for the manufacture, packaging, exposure etc. of photographic elements. Contacting objects can also be photographic elements themselves. For instance, when the photographic element is wound on a reel or stacked in piles, the backing layer of said element is in contact with the uppermost layer of said element.

Other objects of the invention will become apparent from the description hereinafter.

The above objects are accomplished by a method for the preparation of stable aqueous dispersions of finely divided solid spherical polymer beads having an average particle size between about 0.5 and about 5 $\mu$m and having a glass transition temperature of at least 40° C., comprising the steps of:

(A) dissolving in an aqueous solvent mixture of water and at least one water-miscible polar organic solvent (1) at least one $\alpha,\beta$-ethylenically unsaturated monomer capable of forming a polymer that is soluble in the monomer(s) present in said aqueous solvent mixture but which is insoluble in said aqueous solvent mixture, (2) a free radical-forming polymerization initiator (e.g. potassium, sodium, or ammonium persulphate) that is soluble in the aqueous solvent mixture, and (3) a graft-polymerizable polymer containing hydrophilic groups (e.g. sodium or potassium carboxylate or sulphonate groups, hydroxide groups, ethylene oxide groups, and amide or cyclic amide groups), and capable of forming a graft polymer that remains soluble in said aqueous solvent mixture, the weight ratio of said graft-polymerizable polymer to said monomer(s) being in the range from 1.5:100 to 8:100 and the weight ratio of polymerization initiator to monomer(s) from 0.1:100 to 5:100, and (B) heating the solution obtained to a temperature from 50° C. to the reflux temperature thereof, with continuous stirring to initiate by polymerization the simultaneous massive formation of homopolymer or copolymer from said monomer(s) and precipitation thereof, and the formation of a small proportion of graft polymer.

The graft polymer formed and incorporated in the product beads stabilizes the homopolymer or copolymer, which forms the major proportion of the beads, as hereinafter described.

The graft-polymerizable polymer used is a homopolymer or copolymer, which in the presence of radicals and in the conditions described above for the preparation of the polymer beads can be converted into a living molecule, on which by graft-copolymerization sidechains can be implanted. The formation of the living molecule can occur by withdrawal of a labile hydrogen atom or by conversion of originally implanted unsaturated hydrocarbon groups e.g. acrylate groups in the (co)polymer.

Before the beginning of the polymerization the reaction medium mainly consists of a homogeneous solution at room temperature, in the solvent mixture, of the graft-polymerizable polymer, the water-soluble free radical-forming polymerization initiator, and at least one $\alpha,\beta$-ethylenically unsaturated monomer.

By heating this reaction medium the dissolved initiator decomposes and forms free radicals, which then enter into reaction with the dissolved graft-polymerizable polymer either via a labile hydrogen atom or via a reactive position and thus form living molecules, which while remaining dissolved in the aqueous solvent mixture, encounter either reactive monomers or already growing polymer chains of such monomers, thus forming a graft polymer with the original graft-polymerizable polymer.

Two reactions are in fact taking place simultaneously, the first reaction being the polymerization of the greater part of the $\alpha,\beta$-unsaturated monomer(s) to form the polymer core of the final bead and the second reaction being the formation of polymer chains from a very small part of the $\alpha,\beta$-unsaturated monomer(s), which chains graft onto the activated initial polymer.

Polymer beads are thus formed, which are composed of a nucleus and an envelope.

The nucleus of the beads consists of a bundle of intertwisted polymer chains obtained by said polymerization (the above-mentioned first reaction) of the monomer(s) and which is insoluble in the aqueous solvent mixture, and of a small proportion of same polymer chains obtained by copolymerization of the monomer(s) and the initial polymer (the above-mentioned second reaction), said same polymer chains being interwisted with the above-mentioned polymer chains but grafting by one end on the envelope. For clarity's sake the second group of polymer chains will be named hereinafter "grafting polymer chains".

The envelope of the beads mainly consists of the initial graft-polymerizable polymer, which after the above-mentioned second reaction layer-wise surrounds the nucleus and carries said grafting polymer chains, which stretch into the nucleus and make part thereof. The enveloping polymer acts as stabilizer for the nucleus of the beads.

The most important characteristic of the dispersions according to the invention is that discrete solid polymer beads are formed, which are stabilized sterically as a result of the stable circular arrangement in space of the atoms of the stabilizer around the nucleus. Moreover, when the stabilizer comprises ionic groups, these groups while remaining attached to the stabilizer extend radially from the bead surface into the aqueous solvent medium and form a solvate therewith. This solvation has a stabilizing effect that is supplemental to the steric stabilization.

As a result of the anchoring of the envelope to the nucleus and the absence of enclosed solvent in the beads, the formation of conglomerates of beads upon dilution of the dispersion e.g. mixing of the dispersion with the coating composition for a photographic layer, is prevented.

Another advantage of the invention is that with conventional reaction apparatuses polymer beads can be prepared, the average size of which remains within a very narrow range that can be chosen from about 0.5 to about 5 $\mu$m.

A further advantage of the invention is the total absence of any polymer fraction in latex form, in other words of under-sized polymer particles having a diameter of 0.1 $\mu$m or less. This is to be contrasted with previously known methods of bead preparations, which occur in the presence of large amounts of hydrophilic protective colloids such as e.g. gelatin, polyvinyl alcohol, poly-N-vinyl pyrrolidone, or water-soluble cellulose derivatives.

The solid polymer beads prepared according to the method of the present invention have the following characteristics:

they are readily dispersible in water or in an aqueous solvent mixture without formation of conglomerates they are substantially miscible with aqueous colloid solutions such as e.g. solutions of gelatin, polyvinyl alcohol, dextran, poly-N-vinyl pyrrolidone, and water-soluble cellulose derivatives without formation of conglomerates they have a regular spherical shape they have an average size between 0.5 and 5 μm they have a narrow size distribution they have a glass transition temperature of at least 40° C. and thus are highly resistant against mechanical deformation.

Any polar organic liquid that is substantially miscible with water can be used as inert water-miscible solvent for forming together with water the aqueous solvent mixture. Mixtures of several polar organic liquids can be used also together with water to form the aqueous solvent mixture.

Suitable polar organic liquids that are substantially miscible with water and that are solvents for the monomer(s) added are the lower alcohols e.g. methanol, ethanol, and isopropanol and dioxan, acetone, acetonitrile, dimethylformamide, etc.

The organic solvent(s) and the proportion thereof to the water present in the aqueous solvent mixture are chosen such that prior to the polymerization the aqueous solvent mixture is a solvent for the graft-polymerizable polymer containing hydrophilic groups, for the α,β-ethylenically unsaturated monomer(s), and for the initiator, and that after the polymerization it is a non-solvent for the homopolymer or copolymer obtained from the monomer(s) but remains a solvent for the graft polymer formed.

It is possible to influence the results as to the nature and size of the polymer beads into a desired sense by changing the quantitative proportion of organic solvent(s) to water.

The optimum quantitative proportion between these solvents can easily be determined for any selected combination of graft-polymerizable polymer and monomer(s) by making a few tests with changing amounts of organic solvent and water. For instance in the combination of co(styrene/maleic acid monosodium salt) as graft-polymerizable polymer, methyl methacrylate as monomer, and potassium persulphate as initiator the desired average bead size obtained can be predetermined by selecting a given quantitative proportion of water and water-miscible solvent e.g. ethanol. A quantitative proportion of 40 parts by volume of water and 60 parts by volume of ethanol yields a mixture of very coarse beads and a large amount of amorphous precipitate owing to insufficient solubility of the graft polymer formed. A proportion of water/ethanol (43/57) yields beads with an average size of approximately 4 μm. A proportion of 46/54 gives beads sizing 2.79 μm; 50/50 gives beads of 2.56 μm, and 60/40 produces beads of 0.98 μm. A higher proportion of water results in the formation of heterodisperse beads with a very large fraction of very small particles owing to insufficient solubility of the α,β-ethylenically unsaturated monomer(s).

When styrene is used as monomer instead of methyl methacrylate, good results are obtained with a solvent mixture of 30 percent by volume of water and 70 percent by volume of ethanol, to provide homodisperse beads with an average size of 2 μm.

The monomer(s) used in the method of the present invention are chosen so that they are soluble in the aqueous solvent mixture. The polymer(s) formed therefrom are insoluble in the aqueous solvent mixture but soluble in the monomer(s) used, and the polymer beads have a glass transition temperature (Tg) of at least 40° C.

Suitable α,β-ethylenically unsaturated monomers for use in the preparation of the polymer beads are e.g. styrene, vinyltoluene and substituted vinyltoluene e.g. vinyl benzyl chloride and the homologues thereof, chlorostyrene, alkyl methacrylates e.g. methyl methacrylate, ethyl methacrylate, propyl methacrylate, butyl methacrylate and the higher methacrylates, e.g. stearyl methacrylate; substituted alkyl methacrylates e.g. hydroxyethyl methacrylate; butadiene, isobutylene, chlorobutadiene, 2-methylbutadiene; vinyl pyridines e.g. 2- and 4-vinylpyridine, etc. A combination of these monomers as well as one of them alone may be chosen depending on the particular needs. Other monomers than those listed above can be used if only they fulfil the solubility and Tg requirements set. It is possible to combine one or more of the monomers described above with other monomers that themselves do not comply with the requirements described herein for the α,β-ethylenically unsaturated monomers. For instance vinylidene chloride, vinyl chloride, acrylonitrile, and methacrylonitrile are not solvents for their own polymers and can thus not be used for the formation of homopolymers. Nevertheless they can be combined with one or more suitable monomer complying with the requirements set forth to form copolymers that are soluble in the latter monomers.

The graft-polymerizable polymers should:

be sufficiently reactive to form radical-graft-copolymers with the α,β-ethylenically unsaturated monomer(s) present contain hydrophilic groups such as hydroxide, oxide, amide, or carboxylic acid and sulphonic acid groups, which may be neutralized completely or partially with potassium or sodium hydroxide, contain these hydrophilic groups in a number sufficient to make the polymer beads to be formed, stable in aqueous medium, be soluble in the reaction medium of aqueous solvent and unsaturated monomer(s).

Suitable graft-polymerizable polymers for use in the preparation of polymer beads are e.g. polyethylene oxide, low molecular weight polyvinyl alcohol, polyvinyl pyrrolidone, co(vinyl alcohol/vinyl acetate) containing 12 mol % of vinyl acetate units and the same copolymer containing 40 mol % of vinyl acetate units, sodium or potassium salts of co(acrylic acid/styrene) containing 40 to 60 mol % of acrylic acid, co(vinyl acetate/crotonic acid), the reaction products of copoly(styrene/maleic anhydride), of copoly(vinyl acetate/maleic anhydride), of copoly(ethylene/maleic anhydride), or of copoly(N-vinyl pyrrolidone/maleic anhydride) with hydroxyalkyl or aminoalkyl(meth)acrylates, co(styrene/maleic acid monosodium salt), and especially the latter copolymer containing 50 mol% of styrene and 50 mol% of maleic acid monosodium salt. Other graft-polymerizable polymers can be used, which comply with the requirements hereinbefore set forth.

In the production of an aqueous homogeneous dispersion of polymer beads for use in a photographic element in accordance with the invention the size of the beads is determined by the nature of the graft-polymerizable polymer, but can also be controlled by adjustment of other reaction parameters e.g. the concentration of the $\alpha,\beta$-ethylenically unsaturated monomer(s) and especially the proportion between the volumes of water and of the water-miscible solvent in the aqueous solvent mixture. Polymer beads with a predetermined average size of e.g. 1 $\mu$m, 1.5 $\mu$m, 2 $\mu$m, 3 $\mu$m, 4 $\mu$m, and 5 $\mu$m can be prepared in this way.

When in the making of the polymer beads co(styrene/maleic acid monosodium salt) is used, which is composed of equimolar amounts of its monomer components, highly homodisperse beads having an average particle size from 1.0 to 5 $\mu$m can be obtained. Other proportions of the monomer components can be used, of course, and may also lead to interesting results.

In the method of the present invention the weight ratio of the graft-polymerizable polymer to said monomer(s) is generally comprised between 1.5:100 and 8:100. Optimum proportions for obtaining a given average particle size can be easily determined by making some simple tests.

In the method of the present invention excellent results are obtained with the above co(styrene/maleic acid monosodium salt) in the presence of methyl methacrylate monomer in an aqueous solvent mixture of equal volumes of water and ethanol. A high yield of homodisperse polymer beads having a grain size of 2.2 $\mu$m and presenting a favourable filtrability and stability upon prolonged storage at room temperature without the compulsive presence of a large amount of hydrophilic protective colloids is obtained with a weight proportion of 5.0 g of the copolymer to 100 g of methyl methacrylate monomer.

When the weight of said copolymer in respect of said monomer is lowered e.g. to 2.6 g of said copolymer instead of 5.0 g, the polymer beads when left standing form a hard tough polymer mass, which, however, can be redispersed completely by stirring.

If the weight of said copolymer is even further lowered e.g. to 1.3 g per 100 g of methyl methacrylate, insufficiently stabilized, coarse polymer particles are obtained, which instead of being spherical have assumed an irregular eliptical shape and size from 10 to 50 $\mu$m. Moreover, a large proportion of amorphous precipitate is formed at the same time, which strongly hinders isolation by filtration.

Further reduction of the amount of said copolymer results in an almost integral precipitation of polymerized methyl methacrylate in the form of a coarse amorphous polymer mass.

An increase, however, of the amount of said copolymer e.g. up to 7.5 g in respect of 100 g of methyl methacrylate monomer leads to the formation of polymer beads with reduced average size. Moreover, the reaction medium becomes more viscous thus rendering the isolation of the polymer beads more difficult. The precipitation of amorphous polymer mass also increases. A further increase e.g. to 10.0 g of said copolymer per 100 g of methyl methacrylate promotes the solubility and leads to the formation of a shapeless polymer mass.

It has also been observed that in the preparation of beads with co(styrene/maleic acid monosodium salt) as graft-polymerizable polymer the stability of the dispersion is connected with the pH-value as well. With methyl methacrylate as the $\alpha,\beta$-ethylenically unsaturated monomer and co(styrene/maleic acid monosodium salt) as the graft-polymerizable polymer the beads obtained are converted into conglomerates when the pH of the dispersion is lowered to 4.0 by means of hydrochloric acid as a result of the conversion of the carboxylate groups of the polymer into insolubilizing free carboxylic acid groups. If, however, the pH-value is increased again by means of sodium hydroxide, a stable dispersion without conglomerates is restored.

The polymerization initiator being soluble in the aqueous solvent mixture and forming free radicals upon heating is generally present in an amount from 0.1 to 5% by weight based on the amount of monomer(s) present. Suitable polymerization initiators for use in the preparation of the polymer beads according to the invention are persulphates, e.g. potassium sodium and ammonium persulphates or mixtures thereof.

In the case of potassium persulphate amounts of $10.0 \times 10^{-3}$ to $40 \times 10^{-3}$ mol of persulphate per liter of reaction medium yield excellent dispersions of polymer beads. These polymer beads are particularly suitable for use in the surface layer(s) of a photographic element, in accordance with one aspect of the invention.

A reduction in the amount of persulphate as polymerization initiator leads to the formation of larger polymer beads, whereas an increase in the amount of persulphate entails a reduction in the size of the polymer beads. As a consequence, the amount of persulphate in the reaction medium constitutes a parameter that also defines the size of the polymer beads. In other words the results aimed at can be attained by controlling i.a. the exact amount of the polymerization initiator.

It is possible to use the polymerization initiator in amounts outside the range given hereinbefore, though from $40 \times 10^{-3}$ mol on of persulphate per liter of reaction medium the polymer beads seem too small and thus less apt for use in photographic layers and especially for antihalation surface layers. Moreover, the pH of the reaction mixture falls owing to the higher concentration of persulphate thus causing the polymer beads to conglomerate in the case of graft-polymerizable polymers having carboxylic acid groups as hydrophilic groups. This can only be remedied by the addition of sodium hydroxide up to a pH of at least 5. Very low amounts of $1.0 \times 10^{-3}$ mol of persulphate fail to produce dispersions, but mainly form an amorphous precipitate.

When the above described combination of solvents, monomer, polymer, and polymerization initiator are heated to the decomposition temperature of the initiator with thorough stirring, the radicals formed induce the polymerization of the monomer(s) present. By doing so, graft-copolymers of the polymer present are formed as described hereinbefore.

The fact that graft-copolymers are formed indeed can readily be demonstrated by a combination of titration and mass spectrometric analyses. In order to illustrate this, the polymethyl methacrylate beads stabilized with a graft copolymer of methyl methacrylate and co(styrene/maleic acid monosodium salt) as described hereinafter in Preparation 1, were examined as follows.

The bead fraction was isolated from the bead dispersion by centrifuging and divided in two parts. The first part was rinsed twice with the aqueous solvent mixture to form deposit $D_1$, and the second part of the bead fraction was carefully purified by dissolving in acetone, which is a non-solvent for the graft-polymerizable polymer co(styrene/maleic acid monosodium salt), filtering the resulting acetonic solution, and pouring into water, which had been acidified with hydrochloric acid, so as to form a sodium-free deposit $D_2$.

Both deposits $D_1$ and $D_2$ appeared to be fully identical according to infrared examination. Their spectra substantially coincided with that of methyl methacrylate. However, a combined examination by pyrolysis and mass spectrometry clearly demonstrated in both $D_1$ and $D_2$ the presence of styrene in an order of magnitude smaller than 1.0% by weight.

After the isolation of the bead fraction from the bead dispersion by centrifuging as described above, the dissolved polymer fraction was isolated also from the remaining liquid phase by pouring the latter into water, which had been acidified previously with an excess of hydrochloric acid. The precipitating polymer, which appears to be free of potassium as proven by pyrolysis on a platinum plate, was filtered off and analysed also.

Infrared examination clearly showed the characterizing absorption bands of styrene, of maleic acid, and of maleic anhydride. In consequence, however, of the masking effect of the absorption bands of the styrene, the maleic acid, and the maleic anhydride components the presence of methyl methacrylate was not demonstrable with certainty.

Yet, by application of the same combination of pyrolysis and mass spectrometry as well as by functional titration with potassium methylate it could be established that the copolymer obtained from the liquid phase was not co(styrene/maleic acid) but manifestly a copolymer of styrene/maleic acid and methyl methacrylate in a proportion by weight of 31.0/34.6/34.4.

Separation of the polymer beads after graft-polymerization can occur according to methods known in the art, e.g. by spray-drying, centrifuging, etc. Other separation methods can be used also, e.g. evaporation of the solvent medium. But in this case there exists some danger of conglomeration of the polymer particles, which may necessitate an additional fine grinding of the mass.

The separated polymer beads can be added e.g. to the coating composition for a photographic layer. Of course, the usual coating additives can be added to this coating composition.

Sometimes, it may not be necessary, however, to separate the polymer beads from the liquid phase. If desired, they can indeed be added as a dispersion in the liquid phase to a coating composition for a photographic layer. Such coating composition can be coated as such on the rear side of a photographic element or, as the case may be, on top of a photosensitive silver halide emulsion layer.

The photographic layer containing polymer beads in accordance with the present invention has a thickness, which—depending on the purpose of said layer—varies between about 0.5 and about 3 μm. The thickness of said layer is lower than the average size of the polymer beads so that in fact a large number of these polymer beads protrude from the layer. For instance in a layer having a thickness of 0.5 to 1.0 μm, beads sizing 1.0 to 2.0 μm can be used.

Thanks to the presence of these protruding polymer beads in a photographic layer of a photographic element, contact between the latter layer and other surfaces only exists at the smooth tops of the protruding beads and these other surfaces. In this way the dry friction surface is greatly reduced so that abrasion or scratching and consequently dust formation owing to mechanical resistance are highly diminished.

The photographic layer comprising the polymer beads as described above can serve several purposes.

For instance, the photographic layer can be an antifriction surface layer, which reduces dry friction of the photographic element against contacting objects and protects the photographic element against external influences. It can be coated at the rear side of the film support or on the uppermost photosensitive silver halide emulsion layer. The layer can also be a carbon black antihalation layer coated on the rear side of the photographic element, which carbon black layer is eliminated from the support during the processing sequence or said layer can be a coloured antihalation layer that is discoloured in a processing bath and remains on the rear side of the photographic film support. The layer can also be an antistatic surface layer that contains the polymer beads. The antistatic surface layer can be coated on an antihalation layer that is eliminated or discoloured during processing. Furthermore, the layer containing the polymer beads can also be a protective surface layer coated over the photosensitive emulsion layer(s) or at the rear side of the film support, said protective surface layer comprising a hydrophilic colloid e.g. gelatin and said polymer beads dispersed therein as matting agents. It is also possible to use the polymer beads in a top layer of a drafting film, said top layer facilitating writing or drafting thereon. A further interesting application of the polymer beads is in a subbing layer coated on a film support for preventing the surface of the latter during winding up of the subbed film support from sticking to the rear surface of the same or for improving the transport of the subbed film support in a coating machine e.g. during the coating thereon of other layers e.g. silver halide emulsion layers.

When the layer comprising the polymer beads is an antifriction surface layer, it protects the photographic element and more particularly the support or the uppermost photosensitive silver halide emulsion layer against mechanical damage resulting from dry friction against contacting objects and as a result thereof it reduces abrasion and formation of dust. The polymer beads are in dispersed form in a colloid and partially protrude from the surface of the colloid layer.

When the layer comprising the polymer beads has the function of an antihalation layer, it has been applied to the side of the support opposite to that carrying the photosensitive silver halide emulsion layer(s). The layer then contains antihalation dyes or pigments in addition to the polymer beads. Such antihalation layer in dry condition before the processing sequence thus advantageously prevents the photosensitive silver halide layer(s) from sticking to the film support whenever the photographic element is in wound up or stacked condition and at the same time efficiently prevents light that during the image-wise exposure penetrates through the photosensitive silver halide emulsion layer(s) from being reflected by the support and influencing the emulsion layer(s) for a second time.

According to a preferred embodiment of the present invention an antihalation surface layer of a photographic element comprises i.a. a water-insoluble, alkali-soluble, polymeric binder, an antihalation dye or pigment that absorbs the light penetrating through the emulsion layer(s), and the polymer beads as described herein. This antihalation surface layer can be eliminated entirely from the support of the photographic element during one of the first steps of the processing sequence. For instance, the antihalation surface layer containing an alkali-soluble polymeric binder is pretreated in an alkaline prebath and is removed from the rear side of the support in the following waterbath with the aid of rubbing means e.g. rotating brushes during rinsing e.g. spray rinsing, immediately subsequent to the treatment with the alkaline prebath.

More details about water-insoluble, alkali-soluble polymeric binders that can be used advantageously in an antihalation surface layer as set forth above and other features of antihalation coatings can be found in the U.S. Pat. No. 3,853,563. Preferred water-insoluble, alkali-soluble binders are co(styrene/acrylic acid), co(-vinyl acetate/maleic acid), co(ethyl acrylate/methyl methacrylate/methacrylic acid), etc.

The above polymers in their acid form are insoluble in water but dissolve readily in their ionic form so that the antihalation surface layer containing them disintegrates and can be eliminated easily or loosens from the photographic film support in the waterbath. Consequently, a clear photographic film remains.

In order to obtain the desired absorption spectrum e.g. absorption of all light of the visible spectrum in the antihalation surface layer, one or more known light-absorbing pigments or dyes can be used e.g. carbon black, triphenyl methane dyes, etc.

The coating composition for the antihalation surface layer may further comprise one or more surface-active agents e.g. of the type described in U.S. Pat. No. 2,600,831, 3,026,202, and 3,663,229, in Belgian Pat. No. 742,680 and in European published Patent Application No. 00 15 592, sizing agents, waxes, etc.

The coating composition for the antihalation surface layer can be applied to the film support according to known methods. Examples of film supports are films of cellulose triacetate, polyalkylene terephthalate e.g. polyethylene terephthalate, and polycarbonates.

In certain cases it may be advisable to provide the support with a primer coating or a subbing layer before the application of the antihalation surface layer or to pretreat the support superficially according to known techniques such as an electrical treatment with a high voltage corona, etc. An interesting primer coating or subbing layer for application between a polyethylene terephthalate support and the antihalation surface layer has been described e.g. in the U.S. Pat. No. 4,132,552.

In order to facilitate the elimination of the antihalation surface layer in an alkaline processing bath, there may be applied between the film support and the antihalation surface layer an intermediate layer, which has been formed from a mixture of 1 to 3 parts by weight of a cellulose ester, e.g. cellulose diacetate and 3 to 1 part by weight of at least one alkali-soluble polymer as referred to above. More details about such intermediate layers can be found in the Belgian Patent Specification No. 773,588.

The thickness of the antihalation surface layer is not critical, though generally a thickness of 0.5 to 3 $\mu$m as mentioned above is used. The thickness of the layer and the amount of pigment or dye are preferably regulated so that the resulting layer has an optical density of about 0.5 to 1.5.

According to a preferred embodiment of the present invention the polymer beads prepared according to the method of the present invention are used in an antihalation surface layer at the rear side of a photographic element comprising at least one photosensitive silver halide emulsion layer and a cellulose triacetate support. The latter antihalation surface layer comprises polymer beads prepared and composed as described above and sizing from 1.8 to 3 $\mu$m with an average diameter of about 2.2 $\mu$m as well as carbon black as antihalation pigment and a water-insoluble, alkali-soluble binder. This antihalation surface layer is coated at a thickness of about 1 $\mu$m so that the polymer spheres protrude from its surface and consequently act as spacing agents, which offer the advantage of preventing the carbon black from entering into contact with other surfaces. Soiling of rollers or other contacting surfaces with carbon black is thus avoided adequately. This antihalation surface layer can be applied advantageously in cinematographic colour materials.

For graphic arts materials it is also possible to use the polymer beads described above in an antihalation surface layer comprising a hydrophilic colloid as binder and an antihalation dye that can be discoloured in a processing bath. In that case the discoloured antihalation surface layer remains on the photographic film support after processing of the photographic element. Gelatin, casein, polyvinyl alcohol, poly-N-vinyl pyrrolidone, sodium alginate, sodium carboxymethylcellulose etc. can be used as hydrophilic colloid, gelatin being preferred, however.

Since in this case the antihalation surface layer, after having lost its antihalation function by discolouration of the antihalation dye during processing, remains permanently on the support, it may give rise to additional advantages. As a matter of fact the remaining surface layer may reduce the sticking tendency of the photographic element against other surfaces due to the diminished contact surface. This limited contact area may also result in less tendency towards the formation of Newton's rings and towards the generation of static electricity.

The polymer beads used in a photographic element in accordance with the invention can also be incorporated in an antistatic surface layer of said photographic element, the protruding beads reducing the contact surface between said photographic element and the contacting objects so as to prevent the generation of static electricity, which may cause sparks and thus exposure of the photographic element. It is also possible to apply an antistatic surface layer comprising the polymer beads on an antihalation layer at the rear side of the film support of a photographic element e.g. a photographic microfilm element, the antihalation layer dissolving completely and discolouring during development of the photographic element so that nothing remains at the rear side of the film support.

Another interesting application of the polymer beads in accordance with the invention is the use thereof as matting agents in a protective surface layer coated on the uppermost photosensitive silver halide emulsion layer of a photographic element and/or at the rear side of a photographic element. The dispersions of polymer beads can be incorporated by stirring into an aqueous colloid composition e.g. a gelatin composition, which can be provided with the usual coating additives, to form the coating composition for said protective surface layer. The polymer beads protrude from the protective surface layer and consequently give it a mat and rough appearance. They do not have a deleterious or adverse influence on the photosensitive silver halide emulsion layer(s). The antistatic properties of the photographic elements containing the polymer beads as matting agents in (a) protective surface layer(s) are improved. The protective surface layer can be applied to any type of black-and-white or colour photographic silver halide emulsion layer, to a filter layer, to an antihalation layer or to an anti-curling layer.

Another successful use of the polymer beads according to the invention is as matting agents in a surface layer of a drafting film containing a photosensitive layer e.g. a wash-off film.

Although the invention has been described with particular reference to layer(s) of a photosensitive silver halide element, the polymer beads of the invention can also be used in the layer(s) of other materials e.g. in the surface layer(s) of a film support, of photopolymerization materials, of diazotype materials, of thermographic materials, etc.

The polymer beads according to the invention can also be incorporated into polymer films, preferably into a polyethylene terephthalate film, for the purpose of improving the winding up and the storage characteristics, in other words to avoid sticking of the rear surface of an untreated film against the adjacent top surface of said film when wound up on reels. For this purpose the polymer beads can be separated first from the bead dispersion as described above, then ground if desired, and finally added in dry or in wet state according to methods known in the manufacture of polyester film, to the raw materials needed therefor. In this way the polyethylene terephthalate film made according to the usual process comprising stretching and heat-setting acquires favourable winding up and friction characteristics, whereas the optical characteristics can remain almost unaltered. The thus obtained film can be used as the support of a photographic element comprising light-sensitive layers or it can be employed for other purposes. The addition of polymer beads can be to the total mass of polyethylene terephthalate granules or to a part thereof, which part can then be extruded on or co-extruded with the other part of polyethylene terephthalate so as to form a stratum at the surface of the resulting film. The part of polyethylene terephthalate granules containing the polymer beads according to the invention can also be applied by lamination onto the extruded polyethylene terephthalate film so as to form a bead-containing stratum thereon. The amount of polymer beads added to the polyethylene terephthalate should normally not exceed 1% by weight of the total weight of polyethylene terephthalate and polymer beads. Preferably, however, 0.01'%–0.05% by weight of polymer beads is used in respect of the total weight. The preferred size of the polymer beads incorporated into a film is between 1 and 5 μm.

The preparation of polymer beads for use in accordance with the invention is illustrated in the following preparation examples, the average size of the polymer beads stated therein being determined with 2 different instruments, both being marketed by Coulter Electronics Ltd., Coldharbour Lane, Harpenden, Hertfordshire, AL 54 UN, United Kingdom.

The first instrument is the COULTER COUNTER (registered trade mark) Model TA II particle size analyser. The Coulter principle is based on an electric path of small dimensions, which is modulated by momentary passage of each particle one-by-one. Particles suspended in an electrolyte are forced through a small aperture, across which an electric current path has been established. Each particle displaces electrolyte in the aperture producing a pulse equal to its displaced volume. Thus, three dimensions, or particle volume response is the basis for all measuring. The average size of the polymer beads versus their relative volume (weight) or number is given by the instrument. The recorder plots histograms on number and weight basis.

The second instrument is the COULTER (registered trade mark) NANO-SIZER. The measuring principles used in this instrument are those of Brownian Motion and autocorrelation spectroscopy of scattered laser light. The frequency of this Brownian Motion is inversely related to particle size. The instrument also computes a polydispersity index, which is a measure of the width of the size distribution. For instance an index of 0 or 1 would describe an essentially monosized distribution, whereas 8 or 9 would describe a wide range distribution.

PREPARATION 1: POLYMETHYL METHACRYLATE BEADS STABILIZED WITH A GRAFT COPOLYMER OF METHYL METHACRYLATE AND CO(STYRENE/MALEIC ACID MONOSODIUM SALT)

At room temperature 1566 g of a 10% aqueous solution of co(styrene/maleic acid anhydride) adjusted to pH 7.0 by means of sodium hydroxide, 4617 ml of distilled water, and 48.6 g ($12.5 \times 10^{-3}$ mol per liter of reaction medium) of potassium persulphate were placed successively in a 20.0 liter reaction vessel equipped with a stirrer, a thermometer, and a nitrogen inlet above the liquid level. During the entire reaction the atmosphere in the reaction flask was rinsed continuously with nitrogen to keep it free from air.

The mixture was stirred constantly at 140 rpm. After 10 minutes of stirring, the persulphate had dissolved and 5400 ml of ethanol and 3192 ml (3.0 kg) of methyl methacrylate were added at once.

Stirring was then continued for 90 minutes at room temperature. The reaction mixture remained turbid all the time.

Next, the reaction mixture was heated gradually with a waterbath at 65° C. As soon as the temperature in the reaction flask reached 30° C., the reaction mixture became transparent.

At a temperature of 55° to 60° C. the first turbidity was usually seen. After a total heating time of 30 minutes the temperature in the reaction vessel reached 65° C.

As a consequence of the exothermic polymerization reaction the temperature rose gradually to 80° C. At this very moment a weak reflux took place.

The increase in temperature from 60° to 80° C. took almost 45 minutes. During this period the clear solution changed into a milky white dispersion.

The temperature remained for almost 5 minutes a 80° C. and then started falling gradually to 65° C. in about 30 minutes.

Subsequently, the dispersion was stirred for 16 hours on the waterbath at 65° C.

After the polymerization the dispersion was cooled to 30° C. with stirring.

Finally, the dispersion was filtered through a nylon cloth with meshes sizing 75×75 μm.

Yield: 13.19 kg of dispersion of polymethyl methacrylate beads stabilized with a graft copolymer of methyl methacrylate and co(styrene/maleic acid monosodium alt) comprising 23.9 g of beads per 100 g of dispersion (yield of 98.4%) at pH 5.2. The average size of the polymer beads measured with the aid of the COULTER NANO-SIZER was 2.190 μm, the polydispersity index being 0. The COULTER COUNTER Model TA II gave an average size of the beads of 2.02 μm when measured in number percent and of 2.09 μm when measured in weight percent.

PREPARATION 2: POLYSTYRENE BEADS STABILIZED WITH A GRAFT COPOLYMER OF STYRENE AND CO(STYRENE/MALEIC ACID MONOSODIUM SALT)

At room temperature 82.72 g of an aqueous solution containing per 100 g, 10.0 g of co(styrene/maleic acid monosodium salt) and adjusted to pH 7.0 with sodium hydroxide, next 226.9 ml of demineralized water, and finally 1.65 g ($12.5 \times 10^{-3}$ mol per liter of reaction medium) of potassium persulphate were brought at room temperature in a 2.0 liter reaction flask equipped with a stirrer, a thermometer, and a nitrogen inlet above the liquid level. During the entire reaction the atmosphere in the flask was rinsed continuously with nitrogen to keep it free from air.

The mixture was stirred constantly at 140 rpm. After 10 minutes of stirring, the persulphate had dissolved and 165.5 g of styrene and 670 ml of ethanol were introduced at once into the flask.

Stirring was continued at room temperature for 1 h. Next, the reaction flask was heated by means of a waterbath at 70° C.

At 50° C. the solution became clear and at 55° C. the first turbidity was seen.

When the temperature in the reaction flask reached 65° C., the temperature of the waterbath was lowered from 70° C. to 65° C.

A milky white dispersion formed. Stirring at 65° C. was continued for 18 h.

The dispersion was heated for 2 hours more at 80° C. and finally, the polymer dispersion was filtered through a nylon cloth with meshes sizing $70 \times 70$ μm. Yield: 918 g of dispersion comprising 18.6 g of polystyrene beads stabilized with a graft copolymer of styrene and co(styrene/maleic acid monosodium salt) per 100 g of dispersion (yield of 97.4%) of pH 6.0.

The average size of the polymer beads measured with the COULTER NANO-SIZER was 1.99 μm, the polydispersity index being 1.

PREPARATION 3: POLYMETHYL METHACRYLATE BEADS STABILIZED WITH A GRAFT COPOLYMER OF METHYL METHACRYLATE AND POLYETHYLENE OXIDE

At room temperature 52.0 g of polyethylene oxide having a molecular weight of 20,000 was dissolved in a mixture of 2009 g of demineralized water and 1800 ml of ethanol in a 5.0 liter reaction vessel equipped with a stirrer and a reflux condenser.

The solution was stirred constantly at 140 rpm and rinsed with nitrogen during the entire reaction.

An amount of 16.2 g of potassium persulphate was added to the solution and dissolved also at room temperature.

After about 10 min 1000 g of methyl methacrylate was added at once to the clear solution. The slightly opaquing solution was stirred for another 90 min at room temperature.

Next, the opaque solution was heated on a water-bath at 70° C. At 30° C. the solution became completely transparent, but at about 40° C. the clear solution again became opaque as a result of the initiated bead formation and at 60° C. it turned into a milky white dispersion.

Since the polymerization reaction was slightly exothermic, the temperature of the reaction medium rose to 73° C. The exothermic phase lasted approximately 40 min. Afterwards the temperature of the reaction medium fell to about 67° C. The dispersion was stirred then for another 18 h on the water-bath of 70° C. at 140 rpm. The temperature of the dispersion remained at approximately 67° C.

Finally, the dispersion was filtered through a nylon gauze with a mesh width of $75 \times 75$ μm.

Yield: 4520 g of dispersion containing 23.5 g of polymer beads per 100 g of dispersion at pH 5.3.

The average size of the polymer beads measured with the COULTER NANO-SIZER was 1.5 μm, the polydispersity index being 0. The COULTER COUNTER Model TA II gave an average size of the beads, when measured in number percent, of 1.54 μm and, when measured in weight percent of 1.98 μm.

PREPARATION 4: POLYMETHYL METHACRYLATE BEADS STABILIZED WITH A GRAFT COPOLYMER OF METHYL METHACRYLATE AND CO(ACRYLIC ACID/STYRENE SODIUM SALT)

At room temperature 52.2 g of co(acrylic acid/styrene) comprising 36.5% by weight of acrylic acid and 63.5% by weight of styrene and having an intrinsic viscosity $[\eta] = 0.30$ dl/g in methanol at 25° C. was dissolved in 250 ml of demineralized water and 750 ml of ethanol and then adjusted to pH 7.5 with 5N sodium hydroxide in a reaction vessel equipped with a stirrer, a thermometer, and a nitrogen inlet above the liquid level. After the copolymer a volume of 1829 ml of demineralized water and an amount of 16.2 g of potassium persulphate were placed successively in the reaction vessel. During the entire reaction the atmosphere in the reaction vessel was rinsed continuously with nitrogen to keep it free from air.

The mixture was stirred constantly at 140 rpm. After 10 min of stirring, the persulphate had dissolved and 1050 ml of ethanol and 1000 g of methyl methacrylate were added at once.

The procedure described in Preparation 1 was then followed. Yield: 4435 g of dispersion comprising 24.0 g of polymer beads per 100 g of dispersion at pH 5.2.

The average grain size of the polymer beads measured with the COULTER NANO-SIZER was 1.92 μm, the polydispersity index being 0. The COULTER COUNTER Model TA II gave an average size of the beads of 1.13 μm when measured in number percent and of 2.20 μm when measured in weight percent.

PREPARATION 5: POLYMETHYL METHACRYLATE BEADS STABILIZED WITH A GRAFT COPOLYMER OF METHYL METHACRYLATE AND CO(VINYL ALCOHOL/VINYL ACETATE)

At room temperature 52.2 g of co(vinyl alcohol/vinyl acetate) comprising 60% by weight of vinyl alcohol and 40% by weight of vinyl acetate and having an intrinsic viscosity $[\eta] = 0.20$ dl/g in water at 25° C. was dissolved in 2009 ml of demineralized water and 1800 ml of ethanol in a 5.0 liter reaction vessel equipped with a stirrer and a reflux condenser.

The solution was stirred constantly at 140 rpm during the entire reaction.

An amount of 16.2 g of potassium persulphate was added to the solution and dissolved also at room temperature.

After about 10 min 1000 g of methyl methacrylate was added at once to the clear solution. The procedure described in preparation 3 was then repeated.

After filtration 4435 g of dispersion containing 24.0 g of polymer beads per 100 g of dispersion was obtained.

The average size of the polymer beads measured with the COULTER NANO-SIZER was 2.32 μm, the polydispersity index being 1. The COULTER COUNTER Model TA II gave an average size of the beads of 1.40 μm when measured in number percent and of 2.80 μm when measured in weight percent.

PREPARATION 6: POLYMETHYL METHACRYLATE BEADS STABILIZED WITH A GRAFT COPOLYMER OF METHYL METHACRYLATE AND POLY-N-VINYL PYRROLIDONE

At room temperature 52.2 g of poly-N-vinyl pyrrolidone having a molecular weight of 40,000 was dissolved in 2009 ml of demineralized water and 1800 ml of ethanol in a 5 liter reaction vessel equipped with a stirrer and a reflux condenser.

The solution was stirred constantly at 140 rpm during the entire reaction.

An amount of 16.2 g of potassium persulphate was added to the solution and dissolved also at room temperature.

After about 10 min 1000 g of monomethyl methacrylate was added at once to the clear solution. The procedure described in preparation 3 was then repeated.

After filtration 4470 g of dispersion at pH 5.0 containing 24.0 g of polymer beads per 100 g of dispersion was obtained. The average size of the polymer beads measured with the COULTER COUNTER NANO-SIZER was 0.564 μm, the polydispersity index being 3.

PREPARATION 7-12

In this series of preparation examples 7 to 12 the preparation procedure and the reaction components described in preparation 1 were used. This series of examples was planned to illustrate the influence of the quantitative proportion between the solvents of the solvent mixture on the size of the polymer beads obtained. The results are listed in the following table 1. The results of preparation example 1 have been taken over also therein to facilitate comparison. The average size of the beads was measured with the COULTER NANO-SIZER as well as with the COULTER COUNTER Model TA II (average size measured by number percent and average size measured by weight percent).

TABLE 1

| prep. ex. | ml of solvents added to reaction medium water | ml of solvents added to reaction medium ethanol | quantitative proportion in % by volume of water/ethanol | average bead size (dm) in μm measured by NANO-SIZER | average bead size (dm) in μm measured by COULTER COUNTER in number % | average bead size (dm) in μm measured by COULTER COUNTER in weight % |
|---|---|---|---|---|---|---|
| 7 | 3161 | 6856 | 40/60 | amorphous precipitate with beads up to 0.1 μm | | |
| 8 | 3504 | 6513 | 43/57 | 2.675 (0) | 1.38 | 3.90 |
| 9 | 3618 | 6399 | 44/56 | 2.375 (0) | 1.62 | 3.92 |
| 10 | 3846 | 6171 | 46/54 | 2.380 (0) | 2.34 | 2.79 |
| 1 | 4617 | 5400 | 52.75/47.25 | 2.190 (0) | 2.02 | 2.09 |
| 11 | 5446 | 4571 | 60/40 | 1.400 (0) | 0.85 | 0.98 |
| 12 | 6589 | 3428 | 70/30 | 1.100 (3–4) | 0.81 | 2.36 |

In the above table 1 after the value of the average bead size (NANO-SIZER) the polydispersity index is given between parentheses.

From the results of table 1 it can be learned that an increase in the amount of water as solvent in the solvent mixture from 43 to 60% by volume causes the average bead size to decrease considerably (preparation examples 7, 8, 9, 10, 1, and 11).

According to the preparation examples 11 and 12 it was found that upon further increasing the amount of water from 60 to 70% by volume the average bead size did not change considerably, but that essentially only the homodispersity was adversely affected.

The diagrams given in the accompanying figures numbered 1, 2, 3, and 4 show the bead size distribution curves of the polymer beads obtained according to the preparation examples 1, 8, 11, and 12 respectively. These distribution curves were obtained with the COULTER COUNTER Model TA II. The abscissa of each diagram represents the size of the polymer beads in micrometer and the ordinate represents the relative volume (weight) or number of the polymer beads.

TABLE 2

| Prep. ex. | Amount of C in g of C per 100 g of D | Amount of C in g of 10% aqueous solution of C (pH 7) | ml of H₂O (demin.) added to the reaction medium | g of amorphous precipitate per 100 g of C + D | bead size in μm | filtrability through nylon gauze having a mesh width of 75 × 75 μm |
|---|---|---|---|---|---|---|
| 13 | 0 | 0 | 6027 | amorphous precipitate comprising no beads at all | — | — |
| 14 | 1.3 | 391.5 | 5675 | not determined | 10–50 (irregular form) | not filtrable |
| 15 | 2.6 | 783 | 5322 | 3.2 | 2.07 | fairly filtrable; but upon prolonged standing forming a hard cake |
| 1 | 5.2 | 1566 | 4617 | <0.5 | 2.19 | fairly filtrable; a soft |

TABLE 2-continued

| Prep. ex. | Amount of C in g of C per 100 g of D | in g of 10% aqueous solution of C (pH 7) | ml of H$_2$O (demin.) added to the reaction medium | g of amorphous precipitate per 100 g of C + D | bead size in $\mu$m | filtrability through nylon gauze having a mesh width of 75 × 75 $\mu$m |
|---|---|---|---|---|---|---|
| 16 | 7.8 | 2340 | 3921 | 0 | 1.61 | precipitate after prolonged standing, which can be redispersed by simple stirring hardly filtrable as a result of the increased viscosity |
| 17 | 10.0 | 3000 | 3327 | not determined; formation of large amounts of amorphous precipitate | — | — |

C refers to the graft-polymerizable copolymer co(styrene/maleic acid sodium salt)
D refers to the monomer methyl methacrylate.

Figure 1:
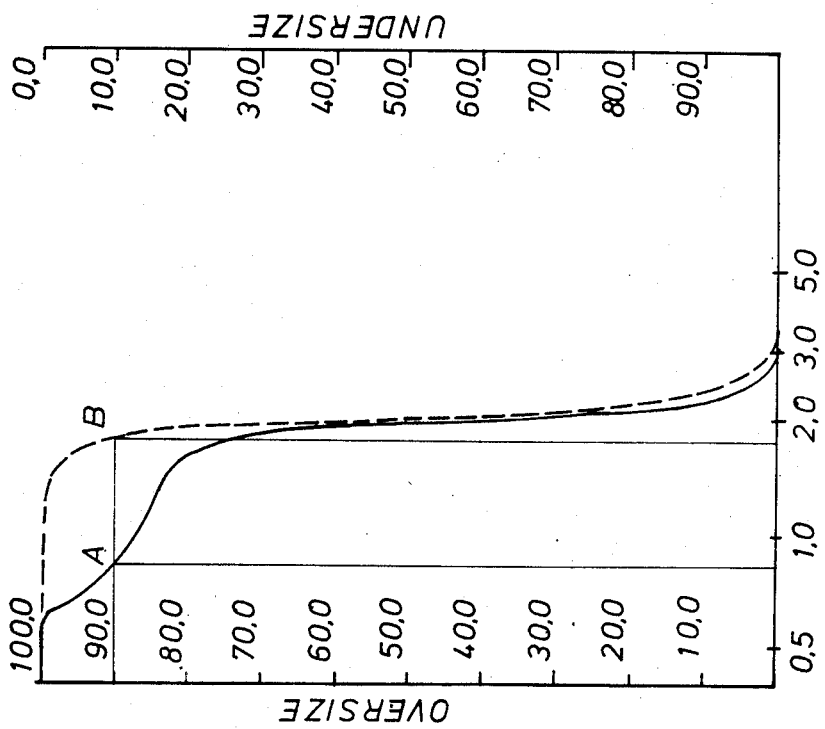
Figure 4:
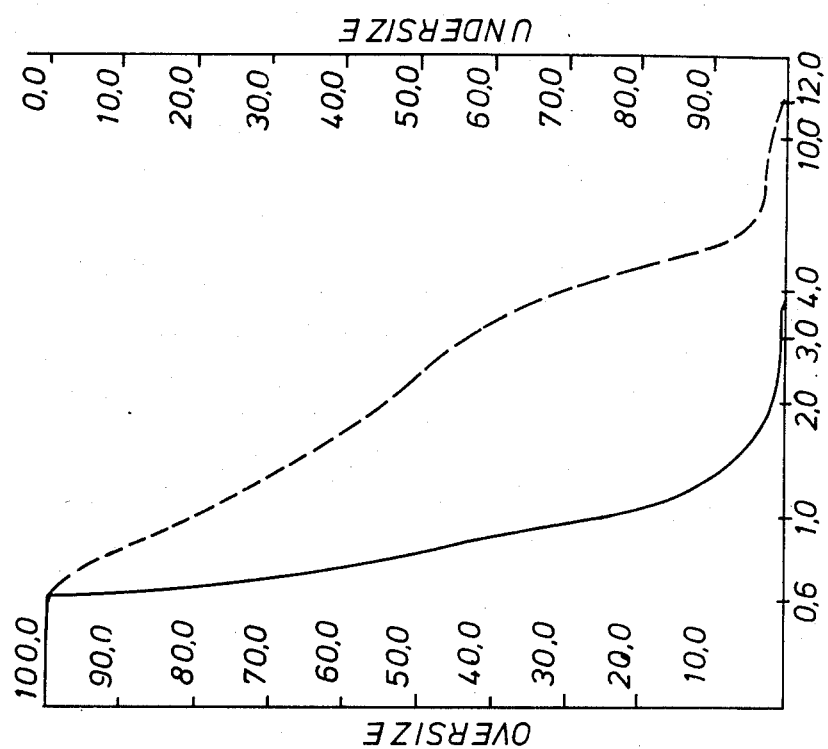
Figure 3:
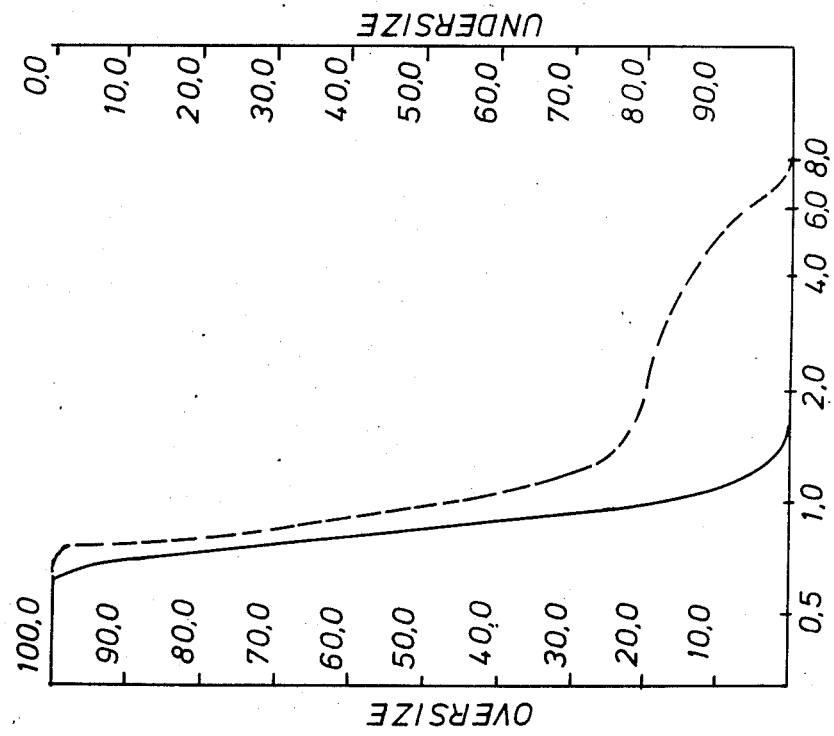

The solid line curves pertain to the number percent of the polymer beads, the dash line curves to the weight percent. For instance, in FIG. 1 point A on the solid line curve indicates that in a number of 100 polymer beads 90 are larger than (oversize) 0.8 $\mu$m and point B on the dash line curve indicates that per 100 g of polymer beads 90 g of beads are larger than (oversize) 1.8 $\mu$m. The same points A and B, when read in terms of undersize, correspondingly indicate that 10 number percent of the beads are smaller than 0.8 and 1.8 $\mu$m respectively. The average particle size in % by number or % by weight is determined at the point corresponding with 50% undersize/oversize.

PREPARATIONS 13–17

Preparations 13–17 illustrate the influence of the amount of graft polymerizable (co)polymer on the formation of beads, more particularly on the size of the beads, their stability, and the amount of undesired amorphous precipitate formed.

The preparations 13–17 were carried out in an analogous way to that described in preparation example 1, with the only difference, however, that the amount of 10% aqueous solution of co(styrene/maleic acid anhydride) (neutralized with sodium hydroxide to pH 7.0) was modified and that the amount of water added afterwards was adapted as indicated in the following table 2. The bead size was measured by means of the COULTER NANO-SIZER.

PREPARATIONS 18–21

In the foregoing preparation examples an amount of 12.5×10$^{-3}$ mol of potassium persulphate initiator was used always per liter of reaction medium, sodium or ammonium persulphate giving the same results.

It seemed advisable to check the relation between the amount of initiator and the final size of the polymer beads obtained. A series of preparation examples 18 to 21 was made therefore. In these preparation examples 18 to 21 the same preparation procedure and the same reaction components as those employed in preparation example 1 were used, with the only difference, however, that the amount of potassium persulphate initiator was modified as indicated in the following table 3.

The results listed in table 3 show that in comparison with the amount of initiator used in example 1 a reduced amount of initiator leads to growing beads and that an increased amount of initiator results in the formation of smaller beads. In order to facilitate comparison lthe results of preparation example 1 have been taken over also in table 3.

TABLE 3

| Preparation example | × 10$^{-3}$ mol/liter of reaction medium | evaluation of dispersed beads | bead size in $\mu$m | pH of dispersion |
|---|---|---|---|---|
| 19 | 1.0 | amorphous precipitate without dispersed beads | | |
| 18 | 5.0 | amorphous precipitate without dispersed beads | | 7.1 |
| 1 | 12.5 | regular homodisperse beads | 2.15 | 5.1 |
| 20 | 20.0 | regular homodisperse beads | 2.16 | 4.9 |
| 21 | 40.0 | regular homodisperse beads | 1.79 | 3.3 |

It follows that between 12.5×10$^{-3}$ and 40×10$^{-3}$ mol of potassium persulphate per liter of reaction medium regular homodisperse beads sizing from 2.36 to 2.15 $\mu$m can be made with otherwise constant reaction components and parameters. Beads of these sizes are very apt for use in an antifriction antihalation surface layer containing carbon black as antihalation pigment.

It was also found that a very high amount of persulphate initiator e.g. 40×10$^{-3}$ mol, besides giving a reduced bead size, also caused the pH-value of the dispersion to fall, so that upon dilution with water, the beads started conglomerating. Only by addition of sodium hydroxide up to a pH of about 6.0 could the beads be re-dispersed.

PREPARATION 22: POLYMETHYL METHACRYLATE BEADS STABILIZED WITH A GRAFT COPOLYMER OF METHYL METHACRYLATE AND CO(STYRENE/-2-ACRYLOYLOXYETHYL MONOMALEINATE/MALEIC ACID SODIUM SALT)

First the copolymer having reactive side groups, viz. co(styrene/2-acryloyloxyethyl monomaleinate/maleic acid sodium salt) was prepared as follows, the proportion of the monomers being 50/5/45 mol %.

In a 1 l reaction vessel equipped with a stirrer, a reflux condenser, and a nitrogen inlet 101 g of co(styrene/maleic anhydride) and 0.1 ml of 0.6% solution of picric acid in acetone were dissolved with stirring at room temperature in 420 ml of acetone. The co(styrene/maleic anhydride) had an equimolar composition and an intrinsic viscosity of 0.32 dl g$^{-1}$ in acetone at 25° C.

An amount of 5.8 g of 2-hydroxyethyl acrylate was added to the solution, which was then stirred for 6 h at 50° C.

As soon as the reaction came to an end, the solution was diluted with acetone to make 1200 ml and then poured out gradually in 12 l of water with continuous stirring. The fibrous copolymer was filtered off and dried in a ventilated drying oven at 40° C. until the weight remained constant.

Yield: 105 g of co(styrene/2-acryloyloxyethyl monomaleinate/maleic acid sodium salt).

Next, 16.7 g of the resulting copolymer were dissolved in 500 ml of water with gradual addition of 5N sodium hydroxide. The pH-value of the solution was adjusted to 7.5. The solution was filtered and diluted with water to make 588 g solution.

The resulting solution was placed in a 2 l reaction flask equipped with a stirrer, a nitrogen inlet, and a reflux condenser. An amount of 5.4 g of potassium persulphate was dissolved therein and 698 ml of ethanol and 333.3 g of methyl methacrylate were added.

The homogeneous solution was rinsed with nitrogen for 2.5 h at room temperature with stirring at 140 rpm and then heated on a water-bath of 65° C.

As soon as the reaction medium attained 63° C. the polymerization became slightly exothermic, the solution then transforming into a milky white dispersion. The temperature continued rising to 73° C. Afterwards the temperature started falling gradually to 63° C. The dispersion was stirred continuously for 16 h at this temperature. Finally, the dispersion was cooled down to room temperature and filtered through a nylon cloth having a mesh width of 120×120 μm.

Yield: 1356 g of dispersion comprising 24.0 g of polymer beads per 100 g of dispersion. The average size of the polymer beads measured with the COULTER COUNTER NANO-SIZER was 2.36 μm, the polydispersity index being 0.

The application of the polymer beads for use in accordance with the invention is illustrated in the following examples.

EXAMPLE 1

A cellulose triacetate film support was coated on its front side with a gelatin subbing layer and on its rear side with anticurling layer essentially consisting of cellulose diacetate. The anticurling layer was covered according to the reverse roller coating system at a ratio of 20 sq.m/l with the following antihalation coating solution:

25% aqueous dispersion of co(ethyl acrylate/methyl methacrylate/methacrylic acid) (50/33.5/16.5): 54 ml
water: 334 ml
methanol: 550 ml
1N ammonium hydroxide: 20 ml
20% aqueous dispersion of carbon black: 25 ml
20% dispersion in water/methanol of wax containing per liter: 14 ml
11.57 g of a mixture of

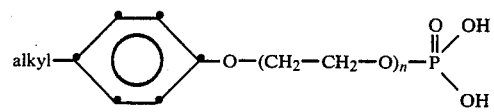

and

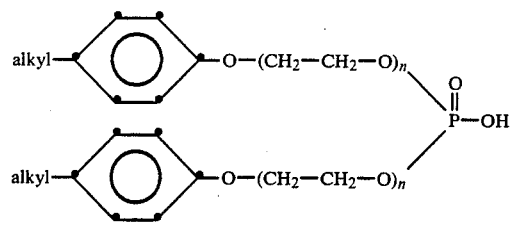

in which alkyl is $C_{15}$–$C_{20}$ alkyl and n is 15 to 20
23.57 g of

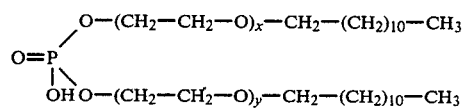

wherein x+y=4
96.4 g of paraffin wax
69.4 g of polyethylene
20% dispersion in equal volumes of ethanol and water of polymer beads consisting of polymethyl methacrylate and the graft copolymer co(styrene/maleic acid monosodium salt) and having an average size of about 2.2 μm according to preparation 1: 3 ml.

After drying with hot air the support carrying the antihalation layer was tested as follows and measurements were carried out as follows.

An adhesive tape was pressed tightly onto the carbon black antihalation layer and then torn off at once. The carbon black layer was not damaged by the adhesive tape and it remained adhering strongly and completely to the support.

The film support with its antihalation layer turned upside was then placed on a flat plate and attempts were made to scratch the antihalation layer with the fingernail. The antihalation layer resisted successfully, however.

The dynamic friction coefficient of the antihalation layer as compared with that of stainless steel was found to be 0.18 to 0.20 as measured with the device described in Jnl. of Scientific Instruments, Volume 28, July 1951, page 220.

The lateral resistance measured at a relative humidity of 60% was 3×10$^7$ ohm/cm2.

The optical density of the antihalation layer was found to be 0.95.

The antihalation layer complied with all requirements concerning the processing of cinematographic colour materials as described in "Abridged specifications for Process ECP-2, Kodak Publication No. H-37". The antihalation layer ran through the pre-bath without soiling it and was eliminated entirely during rinsing.

The splicing of processed film, which had been coated previously with the carbon black antihalation layer, was not adversely affected.

The behaviour of the carbon black antihalation surface layer at the rear side of the film support during the coatin of emulsion layers on the front side of the film support, in other words during the running of the antihalation layer over the various transport rollers of the emulsion coating machine, was simulated and checked in a dust-releasing test by placing a piece of the film support sizing 24×50 cm, the antihalation surface layer turned upside, on a flat plate and rubbing the antihalation surface layer under slight finger pressure with a piece of filter paper sizing 2×2 cm 100 times to and fro in such a way that finally the whole surface of the antihalation layer had been rubbed.

The density of the filter paper was then evaluated as follows. If the filter paper had been soiled during the rubbing of the antihalation layer only to a very little extent, it was accepted that the film support could be conveyed through the emulsion-coating device without getting the transport rollers soiled by the antihalation layer. If, however, the filter paper would have been blackened considerably during the rubbing test, the transport rollers of the emulsion coating device would also have been soiled by the antihalation layer. In the case of an antihalation layer composed as described above in this example 1, the filter paper was soiled but very weakly.

A magnetic sound track paste containing iron(III) oxide as described in the U.K. Patent Specification No. 1,507,983 could be applied easily to the antihalation layer. The magnetic paste adhered very well before as well as after the processing.

A film material comprising the film support and the antihalation layer described above was stored for 24 h at 25° C. and a relative humidity of 60% and then rolled up air-tight and damp-proof the emulsion side against the antihalation side.

After a storage in this condition of 3 days at 57° C., no transfer of black antihalation layer to the emulsion layer or vice-versa could be observed after unrolling.

EXAMPLES 2-4

For comparison with the results of example 1 with the polymer beads according to the invention, 3 strips of film support as described in example 1 were covered with the same antihalation coating solution as described therein, with the only difference that the dispersion of polymer beads was replaced each time by an equivalent amount of one of the following grains or particles:

(a) silica particles having an average size of 3.3 μm, (b) finely divided grains of a hydrophobic reaction product of starch and urea formaldehyde sizing from 5 to 6 μm as described in the U.K. Patent Specification No. 985,115, (c) urea formaldehyde grains containing silica and having an average size of 2 μm, as described in European Patent Application No. 0,003,627.

During a dust-releasing test as described in example 1 with the 3 strips containing the grains (a), (b), or (c) considerably higher amounts of black dust came loose than with the film support carrying the polymer beads as described in example 1.

EXAMPLE 5

A polyethylene terephthalate film support having a thickness of 120 um was coated successively with a subbing layer composition consisting of a copolyester of ethylene glycol with iso- and terephthalic acid and 5-sulpho-isophthalic acid sodium salt and with a coating composition for a carbon black-containing antihalation surface layer at a ratio of 1 l per 35 sq.m according to the air-knife coating system, the coating composition for the antihalation surface layer containing:

demineralized water: 674.4 ml
methanol: 100 ml
5% solution of tetraethylammonium perfluorooctyl sulphite in a mixture of demineralized water and methanol (50:50): 3 ml
resorcinol: 6.5 g
1N ammonium hydroxide: 40 ml
50% aqueous dispersion of paraffin wax: 5.85 ml
60% aqueous dispersion of poly(tetrafluoroethylene): 3.25 ml
20% aqueous dispersion of carbon black: 40.5 ml
25% aqueous dispersion of co(ethyl acrylate/methyl methacrylate/methacrylic acid) (25/50/25): 128 ml
20% dispersion in equal volumes of ethanol and water of the polymethyl methacrylate beads described in example 1: 5 ml The dust-releasing test (described in example 1) with this antihalation surface layer revealed that almost no dust came off. The other tests described in example 1 were repeated with the present antihalation surface layer and also revealed very satisfactory results.

EXAMPLE 6

A biaxially oriented polyethylene terephthalate film support having a thickness of 63 μm was coated on its front side with a subbing layer and on its rear side at a ratio of 1 l per 60 sq.m with the following coating composition for an antihalation layer:

co(styrene/acrylic acid)(70/30): 40 g
triphenylmethane dye corresponding to the formula: 20 g

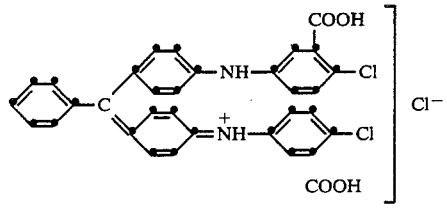

triphenylmethane dye corresponding to the formula: 13 g

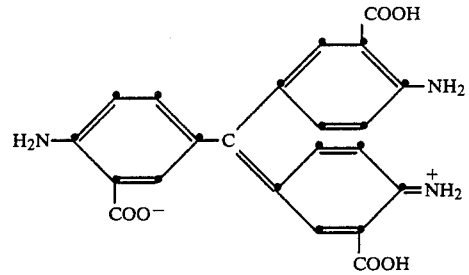

methanol: 200 ml
ethanol: 200 ml
acetone: 600 ml

After having been dried the antihalation layer was covered at a ratio of 1 l per 28 sq.m with the following coating composition for an antistatic surface layer:

co(styrene-sodium maleate)(50/50): 4.8 g
10% aqueous dispersion of polyethylene: 12 ml 10% aqueous solution of a compound corresponding to the following formula: 5.6 ml

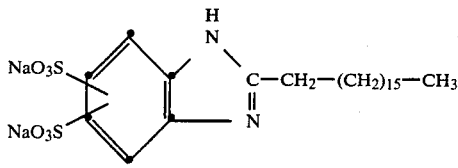

methanol: 190 ml a dispersion in water/ethanol of polystyrene beads stabilized with a graft copolymer of styrene and co(styrene/maleic acid monosodium salt) prepared as described in preparation 2 hereinbefore: 1.2 ml water to make: 1 l The front side of the resulting film support was coated with a gelatin silver halide emulsion as commonly used for microfilm purposes.

Thanks to the polymer beads in the undermost layer the antihalation composition at the rear side of the film support in rolled up condition appeared to withstand storage at high relative humidity very successfully.

During development of the microfilm material the antihalation layer dissolved completely and discoloured spontaneously so that nothing remained at the rear side of the film support.

EXAMPLE 7

A gelatin silver bromoiodide (2 mol % of iodide) X-ray emulsion comprising per kg 80 g of gelatin and an amount of silver halide corresponding to 190 g of silver nitrate was coated on both sides of a subbed cellulose triacetate support at a ratio of about 27 sq.m (per side of support) per kg of emulsion.

At both sides of the support, the emulsion layers while still wet were covered with a gelatinous protective layer or antistress layer from the following coating composition:

gelatin: 30 g sodium diisooctyl sulphosuccinate (5% aqueous solution): 28 ml antistatic agent: 2 g formol (4% aqueous solution): 30 ml matting agent: 28.8 g water to make: 1000 ml 10% aqueous solution of ethoxylated ricinoleic acid containing 40% of ethylene oxide groups was used as antistatic agent.

As matting agent polymer beads were used, which had been prepared according to preparation example 1, the average size of the polymer beads being 2.2 μm. The gelatin antistress layers were coated at a ratio of 1.1 g of gelatin per sq.m and had a thickness of 1.1 μm each. The photographic element obtained was compared with a material prepared in an analogous way but comprising as matting agent a dispersion of polymethyl methacrylate particles prepared by dispersing in water a solution of the polymer in ethyl acetate.

The latter material, unlike the photographic element comprising the polymer beads prepared as described in preparation example 1, had an undesirable milky appearance.

The antistatic properties of the photographic material comprising the protruding polymer beads as described in preparation example 1 were also investigated. They were determined on the one hand by measuring the triboelectric charging of the photographic X-ray film element by rubbing against rubber, packaging of interleave paper and brass and on the other hand by estimating the discharge images produced in the emulsion layer by the sparks formed on rubbing the material in the dark against rubber, brass, polyvinyl chloride and intensifying lead screens, whereupon the light-sensitive element was developed to make visible the discharge images produced. In both cases the antistatic properties proved to be excellent.

The polymer beads of preparation 1 in the gelatin antistress layers did not have any deleterious or adverse influence on the silver halide X-ray emulsion layer.

EXAMPLE 8

2.25 g of bis-1,5-(3-methyl-2-pyrazolin-5-one)-pentamethine oxonol were mixed with 250 g of standard sand 20/30 (designation G-190 by American Society for Testing Materials), the sand being furnished by Ottawa Silica Company Ottawa, Ill., USA, 0.225 g of sodium salt of oleylmethyltauride and a small amount of water to form a highly viscous paste. This mixture was ground for 4 h in a sand mill and then filtered through a glass filter. The sand on the filter was washed with water to remove the adsorbed dye from the sand particles.

A volume of 450 ml of this filtrate was added to a solution of 75 g of gelatin of 975 ml of water with a temperature of 36° C.

The resulting gelatin dispersion was admixed with a dispersion in water/ethanol of polystyrene beads described in preparation 2 and with the necessary coating aids and applied to the rear side of a biaxially oriented polyethylene terephthalate film support such that 0.150 g of bis-1,5-(3-methyl-2-pyrazolin-5-one)-pentamethine oxonol and 5 g of gelatin were present per sq.m.

The front side of the subbed film support was coated with a cadmium-free lithographic silver halide emulsion consisting of 76 mol % of silver chloride, 23 mol % of silver bromide, and 1 mol % of silver iodide, which had been spectrally sensitized with 1-acetylmethoxycarbonylmethyl-substituted, 1-hydroxyethoxycarbonylmethyl-substituted, or 1-ethoxycarbonylmethyl-substituted 5-[(3-sulphobutyl-2-benzoxazolinylidene)-ethylidene]-3-phenyl-2-thiohydantoin. The emulsion containing 0.6 mol of silver halide per kg and 0.1 millimol of spectral sensitizer per mol of silver halide was coated in a ratio of 0.07 mol of silver halide per sq.m of film support. During development of the lithographic material the antihalation layer discoloured completely. Residual stain resulting either from the antihalation dye or from the sensitizing dyes used in the emulsion was practically inexisting.

Thanks to the polymer beads in the remaining discoloured antihalation layer the sticking tendency of the photographic element against other surfaces was reduced very efficiently. The formation of Newton's rings and the generation of static electricity were avoided also.

EXAMPLE 9

Two different amounts of dried non-ground polymer beads prepared as described in preparation 1 were added to two equal amounts of polyethylene terephthalate granules. After mixing, extrusion, and chilling amorphous plates were obtained. Samples were taken from these plates and stretched 3.5 times biaxially in such a way that oriented polyethylene terephthalate film supports were obtained. Next, the samples were heat-set for 10 min at 220° C.

It was found that the addition of a small amount of polymer beads (0.05% by weight of beads calculated on the total weight of polymer beads and polyethylene terephthalate granules) caused the static friction peaks, which are related to the disturbing sticking, blocking and difficult winding behavior, to drop by a factor of more than 10 and made the dynamic friction coefficient decrease markedly as well.

An addition of 0.1% by weight of polymer beads resulted in even lower friction coefficients, but the transparency to light of the film support was reduced slightly, so that the film support could not be used anymore for certain purposes. After the heat-setting step no static friction—and as a result thereof no stick-slip—could be observed anymore.

We claim:

1. Photographic element comprising a support and at least one silver halide emulsion layer wherein said element comprises in a layer of said photographic element and/or in the support thereof finely divided solid spherical polymer beads obtained by the steps of:
   (A) dissolving in an aqueous solvent mixture of water and at least one water-miscible polar organic solvent:
      (1) at least one $\alpha,\beta$-ethylenically unsaturated monomer capable of forming a polymer that is soluble in the monomer(s) present in said aqueous solvent mixture but which is insoluble in said aqueous solvent mixture,
      (2) a free radical-forming polymerization initiator that is soluble in the aqueous solvent mixture, and
      (3) a graft-polymerizable polymer containing hydrophilic groups, and capable of forming a graft polymer that remains soluble in said aqueous solvent mixture,
   the weight ratio of said graft-polymerizable polymer to said monomer(s) being in the range from 1.5:100 to 8:100 and a weight ratio of polymerization initiator to monomer(s) from 0.1:100 to 5:100, and
   (B) heating the solution obtained to a temperature from 50° C. to the reflux temperature thereof with continuous stirring to initiate by polymerization the simultaneous massive formation of homopolymer or copolymer from said monomer and precipitation thereof, and the formation of a small porportion of graft polymer,
said beads characterized in that they comprise a nucleus and an envelope which have different compositions, said nucleus being made up primarily of polymerized $\alpha,\beta$-ethylenically unsaturated monomer(s) and said envelop being made up primarily of grafted polymer chains formed from said polymer containing hydrophilic groups and said $\alpha,\beta$-ethylenically unsaturated monomer(s).

2. Photographic element according to claim 1, wherein said polymer beads are present in an antihalation layer comprising an antihalation dye or pigment.

3. Photographic element according to claim 2, wherein said antihalation dye or pigment is carbon black.

4. Photographic element according to claim 1, wherein said beads are present in a polyethylene terephthalate support.

5. The photographic element of claim 1 wherein said $\alpha,\beta$-ethylenically unsaturated monomer is methyl methacrylate or styrene.

6. The photographic element of claim 1 wherein said graft-polymerizable polymer is co(styrene/maleic acid monosodium salt) (50/50).

7. The photographic element of claim 1 wherein said $\alpha,\beta$-ethylenically unsaturated monomer is methyl methacrylate; said graft-polymerizable polymer is co(styrene/maleic acid monosodium salt) (50/50); the aqueous solvent mixture is a mixture of equal volumes of water and ethanol, and the polymerization initiator is potassium persulphate.

* * * * *

UNITED STATES PATENT AND TRADEMARK OFFICE
CERTIFICATE OF CORRECTION

PATENT NO. : 4,614,708
DATED : September 30, 1986
INVENTOR(S) : Daniel Maurice Timmerman et al It is certified that error appears in the above-identified patent and that said Letters Patent is hereby corrected as shown below:

```
In the heading, "[75] Inventors:," inventor "Wilhelmus
    Janssens, Aarschot" should read -- Jan Henri Janssens,
    Edegem --;

Column 8, line 15, "potassium sodium and ammonium" should
    read -- potassium, sodium and ammonium --;

Column 13, line 47, "0.01'%-0.05%" should read
    -- 0.01%-0.05% --;

Column 19, line 68, "lthe" should read -- the --;

Column 23, line 1, "coatin" should read -- coating --;

Column 25, line 47, "10% aqueous" should read -- A 10%
    aqueous --; and

Column 28, bridging lines 13-14, "said envelop" should
    read -- said envelope --.
```

Signed and Sealed this

Eighteenth Day of April, 1989

Attest:

DONALD J. QUIGG

Attesting Officer

Commissioner of Patents and Trademarks